US007296736B2

(12) United States Patent
Yamagiwa

(10) Patent No.: US 7,296,736 B2
(45) Date of Patent: Nov. 20, 2007

(54) PRODUCT MANAGEMENT SYSTEM

(75) Inventor: Toshio Yamagiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 11/016,391

(22) Filed: Dec. 17, 2004

(65) Prior Publication Data
US 2005/0139664 A1  Jun. 30, 2005

(30) Foreign Application Priority Data
Dec. 25, 2003  (JP)  ............... 2003-428651

(51) Int. Cl.
G06K 5/00  (2006.01)
(52) U.S. Cl. .................. 235/382; 235/380; 235/385
(58) Field of Classification Search ................ 235/385, 235/384
See application file for complete search history.

(56) References Cited

U.S. PATENT DOCUMENTS

| 4,555,414 | A | | 11/1985 | Hoover et al. | |
| 5,459,304 | A | * | 10/1995 | Eisenmann | ................ 235/380 |
| 5,521,815 | A | | 5/1996 | Rose, Jr. | |
| 6,094,487 | A | * | 7/2000 | Butler et al. | ................ 380/270 |
| 6,170,742 | B1 | * | 1/2001 | Yacoob | ................ 235/375 |
| 6,819,986 | B2 | * | 11/2004 | Hong et al. | ................ 701/29 |
| 6,910,628 | B1 | * | 6/2005 | Sehr | ................ 235/384 |
| 2002/0113491 | A1 | | 8/2002 | Eglit et al. | |
| 2005/0088320 | A1 | * | 4/2005 | Kovach | ................ 340/933 |

FOREIGN PATENT DOCUMENTS

| DE | 3313481 | 10/1984 |
| DE | 3817428 | 11/1989 |
| DE | 19607294 | 8/1997 |
| EP | 1 247 706 A2 | 10/2002 |
| FR | 2704670 | 11/1994 |
| JP | 08276459 A | 10/1996 |
| JP | 11066445 | 9/1999 |
| JP | 2001-132002 | 5/2001 |
| JP | 2002-337662 | 11/2002 |
| JP | 2003036485 | 2/2003 |
| NL | 9101758 | 5/1993 |
| WO | WO 94/25936 | 11/1994 |
| WO | WO 95/22467 | 8/1995 |

* cited by examiner

Primary Examiner—Seung Ho Lee
(74) Attorney, Agent, or Firm—Carrier, Blackman & Assoc., P.C.; Joseph P. Carrier; William D. Blackman

(57) ABSTRACT

A product management system has a database, an owner identification device, a card issuance device, and a checking device. The database correlates and stores therein product and owner information in relation to the owner of the product. The owner identification device wirelessly reads out information from an IC tag, which is fixed to the product and has stored therein product information, and also reads out from the database product information and correlated owner information. The card issuance device issues a card having a storage medium for storing the information. The checking device checks and compares information read out from the card, information read out from the IC tag, and information read out from the database, to thus validating the owner of the product. The product management system prevents a product which has been sold from being illegally used by or dealt with a person other than a valid owner.

13 Claims, 8 Drawing Sheets

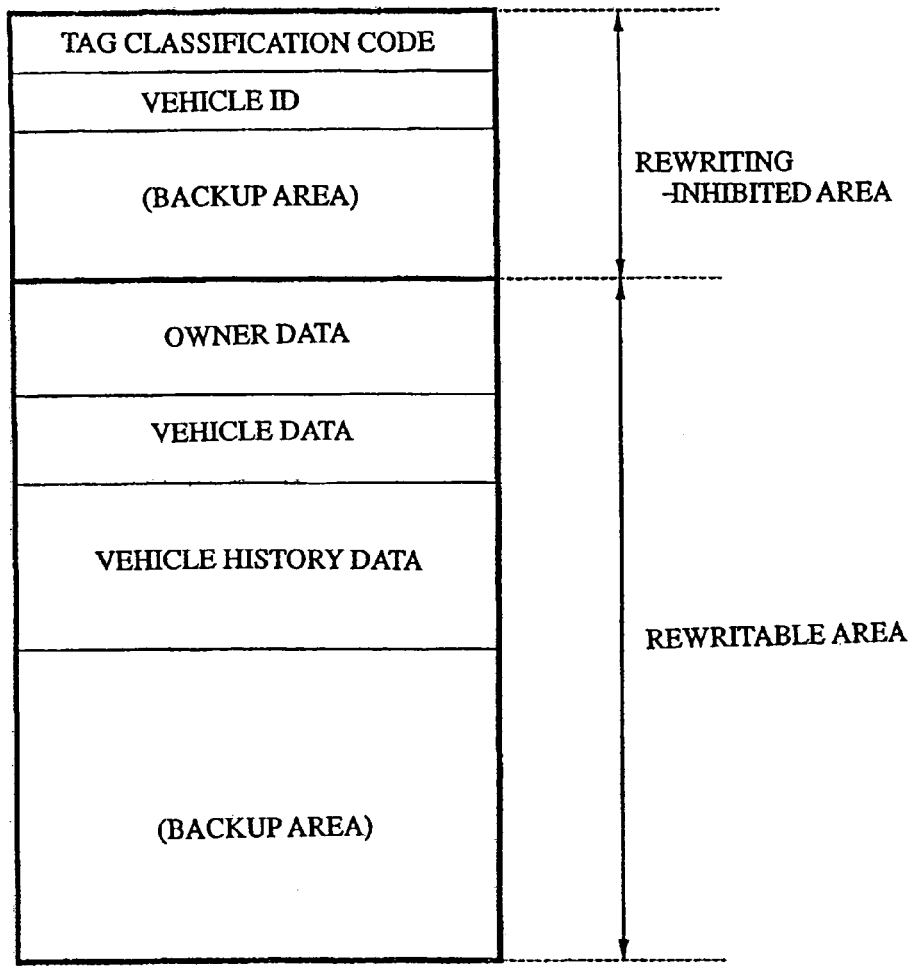

Fig. 8

| VEHICLE ID | xxxxxxx | |
|---|---|---|
| DATE | BRIEF HISTORY | DETAILS |
| YYYYMMDD | MANUFACTURING OF BRAND-NEW VEHICLES | ○○GIKEN KOGYO, △△FACTORY |
| YYYYMMDD | | OWNER'S NAME, ADDRESS |
| YYYYMMDD | FUELING | GAS STATION, FUELED AMOUNT, TRAVEL DISTANCE |
| YYYYMMDD | FUELING | GAS STATION, FUELED AMOUNT, TRAVEL DISTANCE |
| YYYYMMDD | FUELING | GAS STATION, FUELED AMOUNT, TRAVEL DISTANCE |
| YYYYMMDD | REPAIR | MECHANIC'S SHOP, CONTENTS OF REPAIRS |
| YYYYMMDD | FUELING | GAS STATION, FUELED AMOUNT, TRAVEL DISTANCE |
| YYYYMMDD | OWNER CHANGE | 所有者名：XXXX, 住所：XXXXX |
| ......... | ......... | ......... |
| YYYYMMDD | UNREGISTRATION | |
| YYYYMMDD | MANIFEST ISSUANCE | |
| YYYYMMDD | OWNER REGISTRATION | |
| YYYYMMDD | | |
| YYYYMMDD | | |
| YYYYMMDD | | |

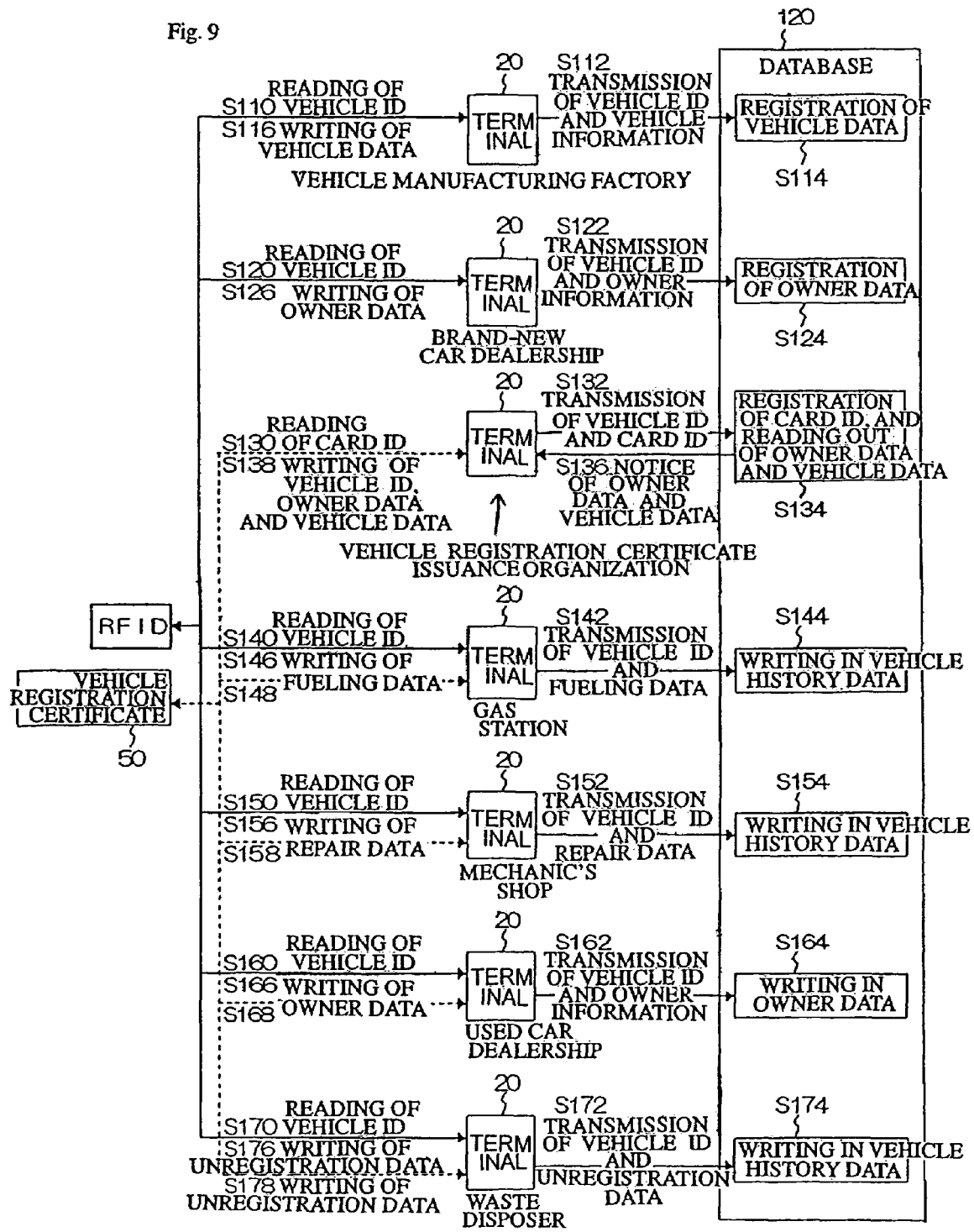

PRODUCT MANAGEMENT SYSTEM

CROSS-REFERENCE TO RELATED APPLICATIONS

The present invention claims priority under 35 USC 119 based on Japanese patent application Ser. No. 2003-428651, filed on Dec. 25, 2003. The subject matter of the priority document is incorporated by reference herein.

BACKGROUND OF THE INVENTION

1. Field of the Invention

The present invention relates to a product management system for managing the registration and/or history information of a product during a period from production of the product to disposal of the product.

2. Description of the Background Art

It is known to store product information on a product or article of manufacture using an Radio Frequency Identification (RFID) tag secured to the product, wherein identification information is communicated wirelessly from the tag. For example, Japanese patent application Laid-Open No. Hei 11-66445 describes an arrangement, as a conventional technology, in which identification information unique to a product, is stored in a product tag fixed to the product. In this disclosure, the product is an article of clothing. When the clothing is to be taken into a fitting room, identification information transmitted from the product is detected. Information in relation to the product based on the identification information thus detected is displayed on a display device provided in the fitting room. In this manner, the theft of the product taken into the fitting room is prevented.

Further, Japanese patent application Laid-Open No.2003-36485 describes a theft prevention system which detects when a product is taken from a store without payment. In this disclosure, a theft prevention tag is used for the theft prevention system which is produced at a low cost and is not easily seen so as not to mar the appearance of the product.

According to the technologies described in the Japanese patent application Laid-Open No. Hei 11-66445 and No.2003-36485, the theft of a product before being sold can be avoided. However, after the product is sold, the above technologies do not prevent the product from being illegally used by or dealt with a person other than a valid owner.

The present invention has been made in view of the above, and an object of the present invention is, therefore, to provide a product management system which detects whether the owner of a product which has been sold is valid, and thereby prevents the product from being illegally used by or dealt with a person other than a valid owner.

SUMMARY OF THE INVENTION

The present invention is made to solve the above described problems. According to one aspect of the invention, there is provided a product management system comprising: a database for correlating and storing information therein, the information includes key information related to a product and owner information relating to the owner of the product; owner identification means for reading out key information from an integrated circuit (IC) tag, which is fixed to the product and has stored therein the key information relating to the product; means for reading out from the database owner information having been correlated with the key information thus read out; card issuance means for issuing a card which has a storage medium for storing the key information; and checking means for checking key information read out from the card, key information read out from the IC tag, and key information read out from the database.

In such an arrangement as described above, key information relating to a product and owner information relating to the owner of the product are correlated and stored in a database in advance. The owner information of the product is then read out therefrom on the basis of key information in an IC tag which is fixed to the product. Moreover, key information read out from an IC tag fixed to a product, key information read out from a card issued to the owner of the product, and key information of the product read out from a database are checked, and thereby validating whether the product has been used by or dealt with a valid owner.

According to another aspect of the present invention, in the product management system as described above, the key information in the IC tag is transmitted and received through wireless communication. In such an arrangement, wireless communication is used to read out key information from an IC tag which is fixed inside or outside a product. Here, the wireless communication means communicates by use of electromagnetic waves, ultrasonic waves, and the like. That is, the electromagnetic wave means comprises one of an electric wave, infra-red radiation, light (visible light) and the like. Accordingly, an electromagnetic wave in an adequate frequency band is used, as needed. For example, an RFID tag may be employed as an IC tag.

According to another aspect of the present invention, in the product management system as described above, the key information in the card is transmitted and received through wireless communication. In such an arrangement, use of a device for reading out information from other IC tags (e.g., an IC tag fixed to a product, and the like) makes it possible to read out key information from an IC tag provided in a card. That means it is possible to standardize devices for reading out information from IC tags. Here, the wireless communication means communicates by use of electromagnetic wave, ultrasonic wave, and the like. The electromagnetic wave means comprises one of an electric wave, infra-red radiation, light (visible light) and the like. Accordingly, an electromagnetic wave in an adequate frequency band is used, as needed. For example, an RFID tag may be employed as an IC tag.

According to another aspect of the present invention, in the product management system as described above, the card and the IC tag store therein the owner information. The owner identification means is permitted to read out the key information from the database when the key information and the owner information read out from the card respectively agree with the key information and the owner information read out from the IC tag. In such an arrangement, accessing a database is not necessary when information read out from an IC tag does not agree with information read out from a card.

According to another aspect of the present invention, in the product management system as described above, the card stores a card ID for identifying a card and the database stores the card ID. In the product management system, the owner identification means identifies an owner as a valid owner when the card ID read out from the card agrees with the card ID read out from the database, and when the owner information read out from the card agrees with the owner information read out from the database. In such an arrangement, for example, when a card is forged, that is, when the key information and the owner information are written in a card whose card ID is different from that of the card with the key information and the owner information stored therein, identification of a valid owner can never be performed by use of the (forged) card. Therefore, use of the forged card can be prevented.

According to another aspect of the present invention, key information read out from an IC tag fixed to a product, key information read out from a card, and key information read out from a database are checked. This checking permits simple validation of whether the product has been used by or dealt with a valid owner, and permits information to be obtained for identifying a valid owner. Therefore, even when a product is stolen, it is possible to quickly locate the stolen product, hence contributing in finding a valid owner, and further preventing or restraining the thefts of products. Using this system, a consumer can validate that a product has not been illegally dealt, and can make purchases safely, for example when purchasing a used car.

Use of an RFID tag as an IC tag to be fixed to a product makes it simple to read out information from the product.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 6 is a schematic diagram of the memory storage configuration of the RFID tag secured to a vehicle showing that the memory includes a rewriting-inhibited (read-only) area and a re-writable area.

FIG. 7 is a schematic view showing the data configuration of owner data contained in the database according to the present embodiment.

FIG. 8 is a schematic view showing the data configuration of vehicle history data contained in the database according to the present embodiment, wherein each data entry includes an event date, an event history, and detailed information about the event.

FIG. 9 is a flow diagram showing the data flow of data registration processing according to the present embodiment.

DETAILED DESCRIPTION OF THE INVENTION

With reference to the drawings, an embodiment of the product management system will be hereinbelow described. As an illustrative embodiment, the product considered hereinbelow is assumed to be a vehicle. However, it is understood that the inventive product management system can be used to manage any product or article of manufacture, and is thus not limited to management of a vehicle.

Figure 1:
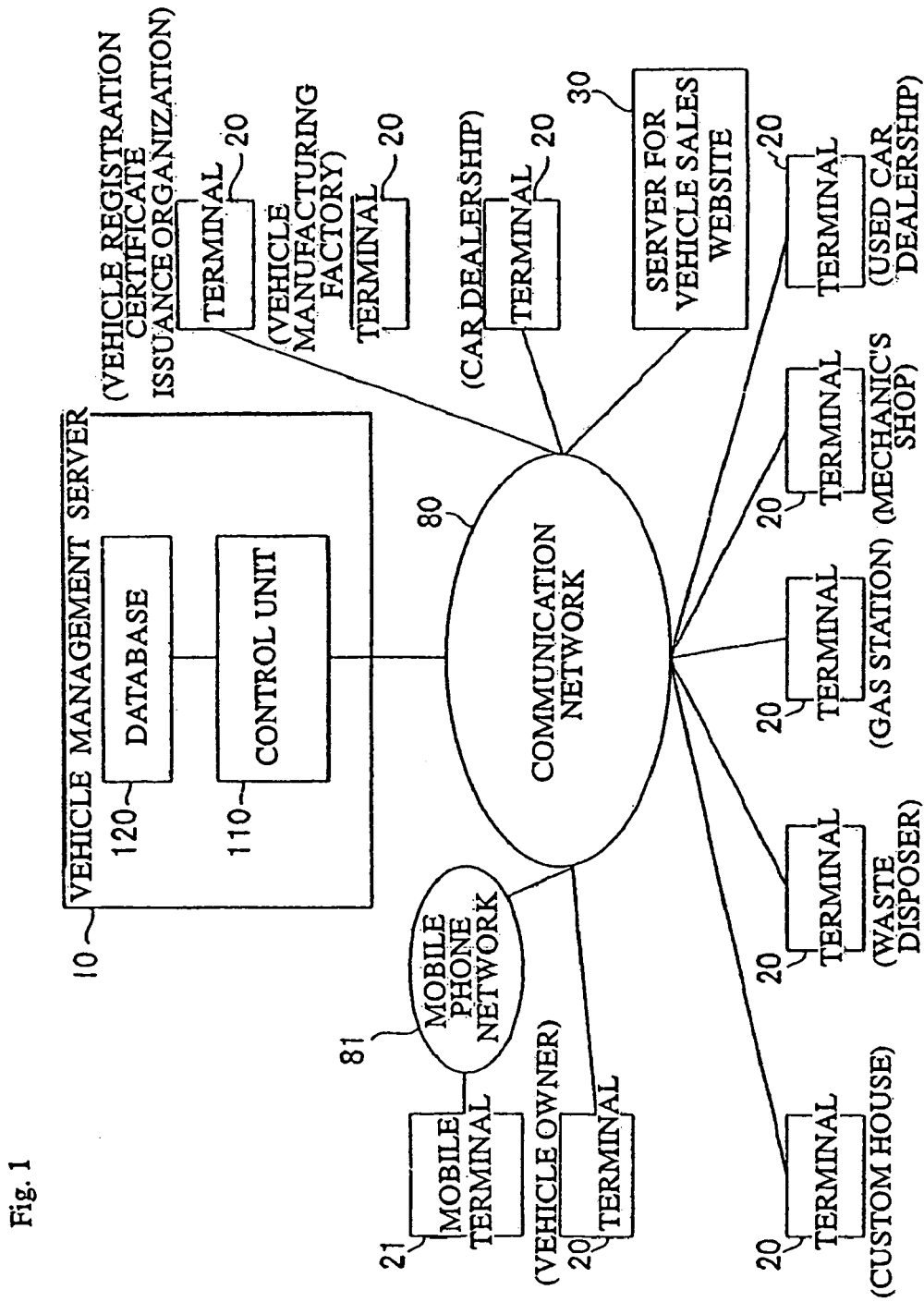
FIG. 1 is a schematic diagram showing an arrangement of a product management system according to an embodiment of the present invention, including a vehicle management server, a communication network, and a plurality of terminals connected to the vehicle management server via the communication network.

FIG. 1 is a block diagram showing the configuration of a product management system according to the embodiment. As shown in FIG. 1, the product management system includes a vehicle management server 10, which has a control unit 110 and a database 120 therein. The control unit 110 includes owner identification means, card issuance means, and checking means. The product management system also comprises a plurality of remote terminals 20. In this system, terminals 20 are provided at a car manufacturing factory, a vehicle registration certificate issuance organization, a brand-new or a used car dealership, a mechanic's shop for vehicles, a gas station, a car scrap company, a custom house, a vehicle owner's house, and the like. Each terminal 20 is connected to a tag reader/writer, as needed. This allows the terminal to be capable of reading information from and writing information in an IC tag fixed to a vehicle and an IC tag (i.e. a storage medium) 72 embedded in a vehicle registration certificate (i.e. a card) 50, described below. The product management system includes a mobile terminal 21 which, for example, a vehicle owner owns. The product management system also includes a server 30 for a vehicle sales website which is provided for car sales. The server 30 communicates with the vehicle management server 10 via a communication network 80 by use of a so-called web interface.

The communication network 80 is network such as internet, Virtual Private Network (VPN), Local Area Network (LAN), and the like. The vehicle management server 10 is capable of communicating with any or all terminals 20, and the server 30 for the vehicle sales website, via the communication network 80. The vehicle management server 10 is also capable of communicating with the mobile terminal 21 via a mobile phone network 81 and the communication network 80.

The database 120 of the vehicle management server 10 correlates and stores therein identification information of the vehicle, identification information of a card (i.e. a vehicle registration certificate 50), owner information indicative of information with regard to an owner, vehicle information indicative of information with regard to the vehicle, and vehicle history information indicative of the history of the vehicle for respective vehicles. The control unit 110, as will be described hereinafter, refers to (reads) data previously stored in the database 120 and writes data into the database 120, while transmitting and receiving data with the terminal(s) 20, mobile terminal 21, the server 30 for the vehicle sales website, and the like. The control unit 110 checks key information with regard to a vehicle, which is read out from each of the vehicle certificate 50, the IC tag fixed to the vehicle, and the database 120, and validates whether the vehicle has been illegally used or dealt. The key information may be one out of, or any combination of, the identification information of the vehicle, the identification information of the card, the owner information, and the vehicle history information.

Note that the vehicle management server 10, the terminal 20 and the server 30 for the vehicle sales website are realized by use of a computer. As the mobile terminal 21, a mobile type phone terminal (i.e. a mobile phone terminal or a Personal Handyphone System ((PHS), a trademark) and a Personal Digital Assistant (PDA) are employed. Each of these devices has a central processing unit (CPU) inside. Processes for processing performed by each of these devices are stored in a computer-readable storage medium in the form of a computer program, and the CPU reads out and executes the program, whereby the above processing is performed. Here, the computer-readable storage media designates a magnetic disc, a magnetic optic disc, a CD-ROM, a DVD-ROM, a semi-conductor memory and the like. Alternatively, the arrangement may take a form in which the computer program is transmitted to a computer through communication lines, and a CPU, provided in the computer which received the computer program, executes the program.

The IC tag to be fixed to the vehicle has an interface for exterior communication and a memory, and is capable of reading information from, and writing and storing information in, the memory. In the IC tag, an identifier (ID) to be used for identifying the IC tag is stored in advance. In the present embodiment, an RFID (Radio Frequency IDentification) is used as an IC tag. The RFID incorporates an aerial, which is used for performing wireless communication by use of radio frequency. The RFID also incorporates a semiconductor memory including both a rewriting-inhibited area and a rewritable area. In the rewriting-inhibited area, an ID is written in advance to be used as a vehicle ID (i.e. an identification information of a vehicle). Meanwhile, the owner information, the vehicle information, the vehicle history information, and the like are written in the rewritable area.

Figure 2:
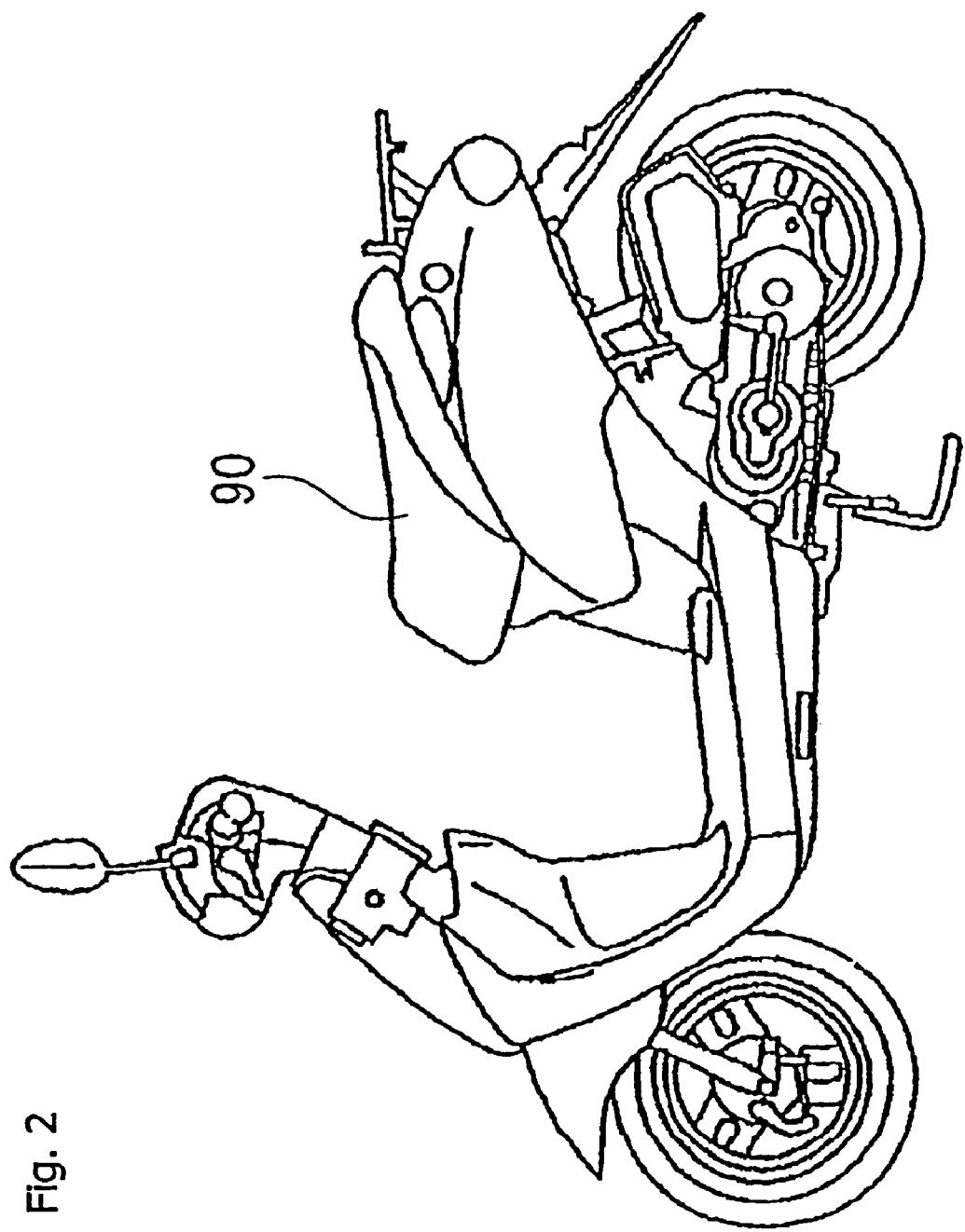
FIG. 2 is a side view of a two wheeled vehicle illustrating that RFID tags may be fixed within the seat of the vehicle according to the present embodiment.

The case in which the vehicle is a two wheeled vehicle is illustrated in FIG. 2. FIG. 2 is a side view of a motorcycle showing a preferred location in which RFID tags are fixed. Reference numeral 90 designates a seat for a rider, and the seat is manufactured by using resin members. The RFID tags are configured to be provided inside the seat 90.

Figure 3:
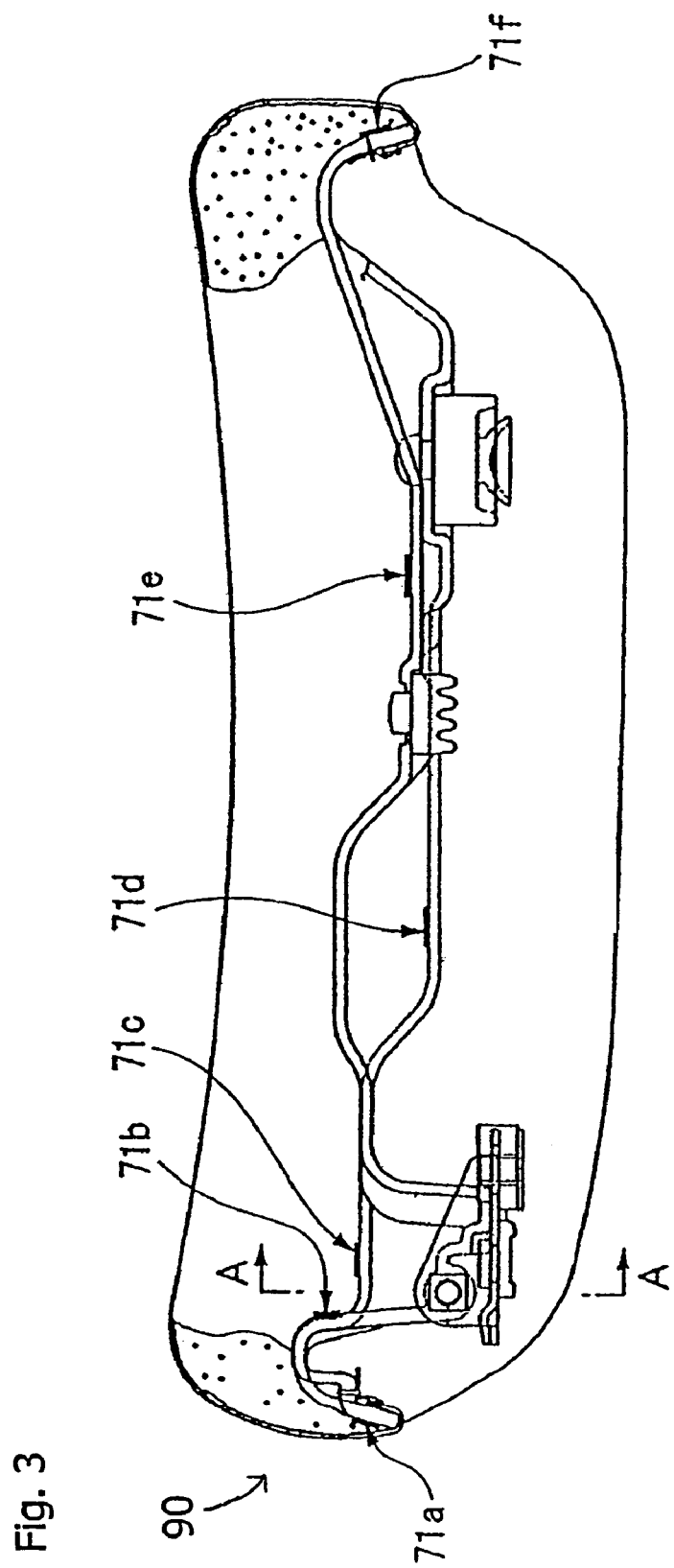
FIG. 3 is a detailed cross-sectional view of the vehicle seat of FIG. 2, showing a plurality of possible places where RFID tags may be fixed within the seat.
Figure 4:
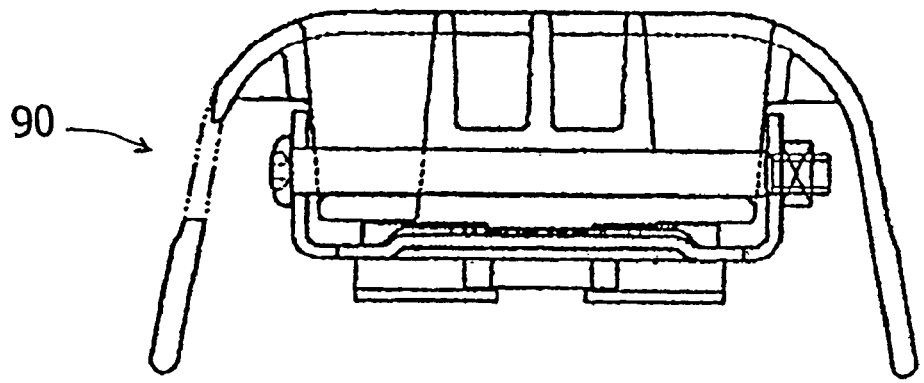
FIG. 4 is a cross sectional-view of the seat of FIG. 2, taken along the A-A line in FIG. 3.

FIG. 3 is a longitudinal cross-sectional view of the seat 90 of FIG. 2. In this drawing, reference numerals 71a, 71b, 71c, 71d, 71e, and 71f respectively each show one example of a position to which the RFID tags may be fixed. The RFID tags may fixed to any position(s) from 71a to 71f. However, in particular, when the RFID tags are fixed at the positions 71a and 71f, since the distance between a surface of the seat and the positions 71a and 71f of these RFID tags is short, it is possible to bring an RFID reader/writer closer to the RFID tags. FIG. 4 is a cross-sectional view of the seat taken along the A-A line in FIG. 3.

Note that, as shown in FIG. 3, the resin members used for the seat have a certain thickness in the vertical direction so as to serve as a buffer for a rider. Accordingly, when the RFID tags are fixed to the positions 71b, 71c, 71d and 71e, the distance between the surface of the seat and any one of these RFID tags is relatively long. On the other hand, when the RFID tags are fixed to the front or the rear of the seat, as in the case of 71a and 71f, the distance between the surface of the seat and any one of these two RFID tags is relatively short. Accordingly, if the distance which a signal (i.e. an electromagnetic wave) resulting from the operations of reading and writing from the RFID tags can be transmitted is relatively short, the RFID tag is fixed to the position 71a or 71f which is relatively close to the surface of the seat. In this way, it is possible to bring a reading device closer to the RFID tag and to make the operations of reading and writing operations easy.

The positions at which the RFID tags are fixed, described with respect to FIGS. 2 to 4 for a motorcycle, are also applicable to other saddle-type vehicles including, but not limited to, a motorized or non-motorized bicycle, a personal watercraft (jet-ski) or all-terrain vehicle. Since the seat is manufactured by using resin members through which an electromagnetic signal can pass, fixing the RFID tags inside a seat as described above is a reasonable way to read and write in the stored information in the RFID tags by use of the electromagnetic wave signal. In a vehicle having a saddle type seat, there is generally not a covering of metal (i.e., a vehicle roof) overlying the seat. Therefore it is possible to dispose an RFID reader/writer (i.e. a tag reader/writer) above the position at which the vehicle stops, for example, at a gas station, mechanic's shop, road and the like. Therefore, placement of the RFID within a seat is also convenient. The RFID tags are intended to stay fixed to a vehicle from the time of manufacturing of the vehicle to the time of scrapping thereof. Thus, a further advantage to placement of the RFID within the seat is that the seat construction prevents the RFID tags from easily falling off.

In the case where a vehicle is one such as a passenger car, a bus, a truck, and the like, each of which has a roof made of metal, the RFID tags are fixed inside the seat in advance, and information of the RFID tags are read out with a portable reading/writing device which is hand-carried into the vehicle. It is also possible to fix the RFID tags in the vicinity of the front windshield or the rear windshield of the passenger car. For example, the RFID tags may be fixed to the dashboard of the passenger car in advance so that the RFID tags are read out and written to through a window from a location outside and above the vehicle. The RFID tags may also be fixed inside resin members which are used to construct the dashboard.

Figure 5:
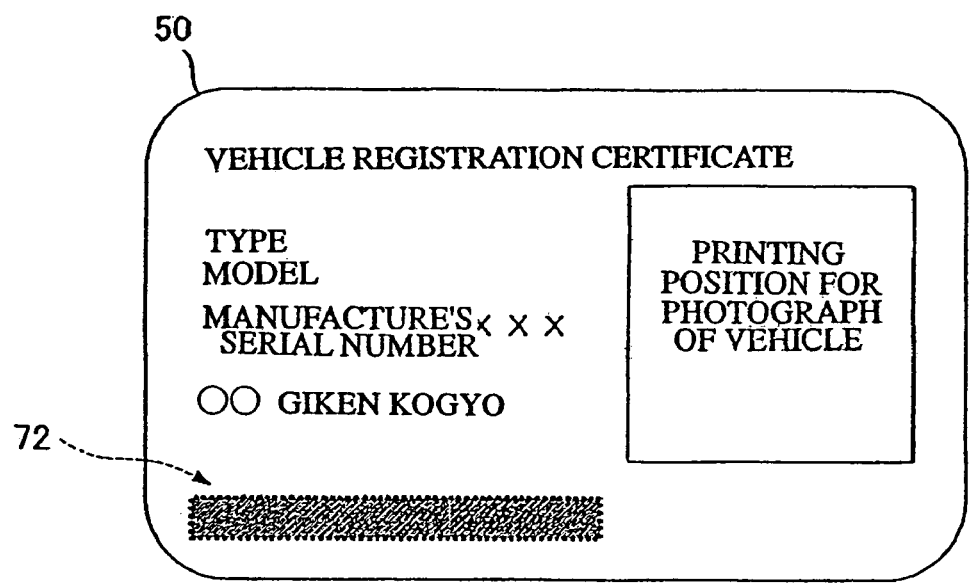
FIG. 5 is a schematic view of a front face of an example of a vehicle registration certificate showing an IC tag secured thereon and showing a possible location for an image of the vehicle to be placed thereon according to the present embodiment.

A vehicle registration certificate 50 which is employed as a card in the present system will be described hereinbelow. FIG. 5 is a schematic view showing an example of a face of the card of the vehicle registration certificate 50. In this drawing, the vehicle registration certificate 50 is a certificate to be issued one by one for each vehicle. As shown in the drawing, vehicle information such as the type and model year (shown in FIG. 5 as "Model 2003"), the manufacture's serial number, the name of the manufacturer, and the like of a vehicle is described on the surface of the card. Additionally, a photograph of the vehicle is printed or attached to the face of the card. Moreover, an IC tag 72 serving as a storage medium is embedded in the vehicle registration certificate 50, and an RFID tag is herein employed for the IC tag. This RFID tag 72 is arranged in a manner similar to that of the RFID tag fixed to a vehicle. However, an ID, which is written in advance in a rewriting-inhibited area of the RFID tag 72, is used as a card ID (i.e. identification information of a card) to designate the RFID tag 72 as a card RFID. Further, a vehicle ID is written in the rewriting-inhibited area at the time of issuing the vehicle registration certificate 50. In the rewritable area, owner information, vehicle information and vehicle history information are written in a manner similar to that for the RFID tag fixed to the vehicle.

The above described card ID is an ID which is allocated for every card body at the time of producing a card, and which is written in advance in the card, so as to be capable of identifying completely and uniquely the card body by use of this card ID.

Note that this vehicle registration certificate 50 is to be issued by a manufacturer for manufacturing vehicles, a public organization which controls vehicle registration, and the like. The size of the vehicle registration certificate 50 is roughly the size of a credit card, which is about 5.3 cm in height and 8.5 cm in width, for example, and the material thereof is plastic and the like.

Next, information, which is stored in an RFID tag fixed to a vehicle, will be described hereinbelow. FIG. 6 is a schematic view showing the arrangement of data stored in a memory of the RFID tag which is fixed to a vehicle. As shown in FIG. 6, the memory has a rewriting-inhibited area and a rewritable area. To form the rewriting-inhibited area, a Read Only Memory (ROM) is used so as to inhibit a rewriting operation. Alternatively, the RFID tag may have a control function which prevents a rewriting operation from being performed in the rewriting-inhibited area.

A tag classification code and a vehicle ID are stored in the rewriting-inhibited area, and a backup area is also provided thereon. The tag classification code is code information to be used for determining whether the RFID tag is an RFID tag fixed to a vehicle or an RFID 72 tag provided in a vehicle registration certificate 50. A code indicative of the RFID tag fixed to the vehicle is set for the above described code information.

Furthermore, in the rewritable area, owner data, vehicle data and vehicle history data are stored, and a backup area is further provided within the rewritable area. The owner data, vehicle data, and vehicle history data are also stored in the RFID tag 72 of the vehicle registration certificate 50, and the database 120 in a similar manner, as will be described hereinafter. That is, in the present system, since the vehicle management server 10 and the terminals 20 are capable of communicating with each other via the communication network 80, data stored in and managed by the database 120 and data stored in the RFID tag fixed to the vehicle, are updated in a synchronized manner, as needed, appropriately. Furthermore, at the same time, data in the RFID tag 72 of the vehicle registration certificate 50 are also updated. As used herein, data refers to, but is not limited to, owner data, vehicle data, and vehicle history data. Moreover, since the capacity of storage area for the RFID tag is limited, the database 120 may be arranged to have the whole set of the respective aforementioned data, while the RFID tag may be arranged to have only a subset of the respective aforementioned data.

The RFID tag 72 of the vehicle registration certificate 50 stores data by having a data arrangement similar to that of the RFID tag fixed to the vehicle as described above. But in the rewriting-inhibiting area, a card ID, a vehicle ID, and a tag classification code, where a code indicative of the RFID tag 72 provided in the vehicle registration certificate 50 is set, are stored.

Next, with reference to FIGS. 7 and 8, data stored in the database 120 will be described. However, the data shown in FIGS. 7 and 8 are partly or entirely stored in the RFID tag fixed to a vehicle or the RFID tag 72 of the vehicle registration certificate 50 for each vehicle.

FIG. 7 is a schematic view showing a data arrangement of owner data stored in the database 120. As shown in FIG. 7, the owner data include owner information which corresponds to the vehicle ID. The owner information designates owner's name, the date of birth, address, and the like.

FIG. 8 is a schematic view showing a data arrangement of the vehicle history data stored in the database 120. As seen in the example shown in FIG. 8, the vehicle history data have vehicle history information for every vehicle (of every vehicle ID). Additionally, the vehicle history data at least includes respective data items for date, brief history, and details. Data in the data items for the brief history are, for example, "manufacturing of brand-new vehicles", "owner registration", "owner change", "fueling", "repair", "deregistration", "manifest issuance", and the like. For the vehicle history information, whenever an event corresponding to any one of the information takes place, information corresponding thereto is generated at the terminal 20. This information is written in the RFID tag fixed to the vehicle and in the RFID tag 72 of the vehicle registration certificate 50, as needed, and is concurrently transmitted from the terminal 20 to the vehicle management server 10. The control unit 110 of the vehicle management server 10 performs a writing operation in the database 120 based on the information thus transmitted.

In the case where the brief history indicates "manufacturing of brand-new vehicles", the name of a manufacture and the name of a manufacturing factory are written as detailed data. In the case where the brief history indicates "owner registration", owner's name and owner's address are written as detailed data. In the case where the brief history indicates "fueling", information specifying a gas station, fueled amount, travel distance information at the time of fueling, and the like are written as detailed data. In the case where the brief history indicates "repair", the name of a mechanic's shop and the contents of repair are written as detailed data. In the case where the brief history indicates "owner change", new owner's name, new owner's address, and the like are written as detailed data.

Next, operations for data registration processing to be performed on the database 120 of the vehicle management server 10, an RFID tag to be fixed to a vehicle, and a vehicle registration certificate 50 will be described hereinbelow. FIG. 9 is a schematic view showing a data flow of the data registration processing.

(1) Firstly, when a vehicle is manufactured at a vehicle manufacturing factory, the brand-new vehicle is registered in the database 120 of the vehicle management server 10. That is, a terminal 20 at the vehicle manufacturing factory reads out a vehicle ID from an RFID tag to be fixed to the brand-new vehicle (Step S110). Further, after vehicle information of the vehicle to which the RFID tag is fixed is inputted, the terminal 20 at the vehicle manufacturing factory transmits the vehicle information thus inputted along with the vehicle ID thus read out to the vehicle management server 10 (Step S112). Once the control unit 110 of the vehicle management server 10 receives the vehicle ID and the vehicle information from the terminal 20 at the vehicle manufacturing factory, it establishes a correlation between them and registers the same in the database 120 as vehicle data for the brand-new vehicle (Step S114). When the registration has been performed successfully, the terminal 20 at the vehicle manufacturing factory writes the vehicle information registered in the database 120 in vehicle data of an RFID tag (Step S116). The RFID tag in which the above described data has been written will be fixed to the brand-new vehicle before it is dispatched from the factory.

(2) When the brand-new vehicle is sold at a car dealership, the owner who bought it will be registered. A terminal 20 at the car dealership reads out the vehicle ID from the RFID tag fixed to the brand-new vehicle (Step S120). Furthermore, after owner information of the brand-new vehicle is inputted into the terminal 20 at the car dealership, the terminal 20 at the car dealership transmits the owner information thus inputted along with the vehicle ID thus read out to the vehicle management server 10 (Step S122). Once the control unit 110 of the vehicle management server 10 receives the vehicle ID and the vehicle information from the terminal 20 of the vehicle manufacturing factory, it establishes a correlation between them and registers the same in the database 120 as owner data for the brand-new vehicle (Step S124). When the registration has been performed successfully, the terminal 20 at the car dealership writes the owner data registered in the database 120 in the RFID tag (Step S126). Moreover, transmission and reception of the information between the terminal 20 at the car dealership and the vehicle management server 10 may be performed via the server 30 for the vehicle sales website.

In the case where the vehicle is imported, and is imported from a country (a region) that is managed according to the product management system, processing similar to that for a used car transfer, which will be described hereinafter, is performed. When the vehicle is one imported from other countries (regions), vehicle data, owner data, and vehicle history data in the past corresponding to this imported vehicle to be registered as a brand-new vehicle are correlated with the vehicle ID which is read out from an RFID tag fixed to the vehicle, and are registered in the database 120 of the vehicle management server 10. Further, the vehicle data, owner data, and the vehicle history data in the past, which have been registered in the database 120 of the vehicle management server 10, are written into the RFID tag fixed to the vehicle. At this time, necessary information is received, for example, from a terminal 20 at a custom house.

(3) Subsequently, a vehicle registration certificate 50 is issued to a vehicle sold in (2) as described above by a vehicle registration certificate issuance organization. That is, a card ID is read out from an RFID tag 72 of the vehicle registration certificate 50 to be issued by a terminal 20 at the vehicle registration certificate issuance organization (Step S130). Furthermore, the vehicle ID observed from the car dealership is inputted to the terminal 20 at the vehicle registration certificate issuance organization, and the terminal 20 then transmits the vehicle ID along with the card ID thus read out to the vehicle management server 10 (Step S132). Once the control unit 110 of the vehicle management server 10 receives the card ID and the vehicle ID transmitted from the terminal 20 at the vehicle registration certificate issuance organization, it establishes a correlation between them and registers the same in the database 120 (Step S134). Next, the control unit 110 reads out from the database 120 the owner data and the vehicle data corresponding to the vehicle ID thus received, then gives an notice to the terminal 20, and gives instruction for issuing a vehicle registration certificate 50 to the terminal 20 (Step S136). The terminal 20 at the vehicle registration certificate issuance organization writes the inputted vehicle ID, the owner data and the vehicle data received from the vehicle management server 10, into the RFID tag of a vehicle registration certificate 50, whereby a vehicle registration certificate 50 is issued (Step S138). Meanwhile, when a vehicle is an imported one, the vehicle history data of the imported vehicle are further noticed from the vehicle management server 10, and are written into an RFID tag 72 of a vehicle registration certificate 50. The vehicle registration certificate 50 thus issued is handed over directly or via a car dealership to the vehicle owner.

(4) When the owner of the vehicle fuels his/her vehicle at a gas station, a terminal 20 at the gas station transmits the vehicle ID read out from the RFID tag fixed to the vehicle along with data (information of fueled amount, travel distance information, information of the location of the gas station, and the like) in relation to the fueling, to the vehicle management server 10 (Step S140 and Step S142). Once the control unit 110 of the vehicle management server 10 receives the vehicle ID and the data in relation to the fueling (fueling data), the control unit 110 writes the fueling data as vehicle history information on the vehicle history data in the database 120 corresponding to the vehicle ID (Step S144). When the writing is performed successfully, the terminal 20 at the gas station writes the fueling data thus registered as vehicle history information in vehicle history data in the RFID tag fixed to the vehicle and the RFID tag 72 of the vehicle registration certificate 50 (Step S146 and Step S148).

(5) When the owner of the vehicle goes to a mechanic's shop for repairing his/her vehicle, a terminal 20 at the mechanic's shop transmits the vehicle ID read out from the RFID tag fixed to the vehicle along with data (repair data) for the repairing to the vehicle management server 10 (Step S150 and Step S152). Once the control unit 110 of the vehicle management server 10 receives the vehicle ID and the repair data, the control unit 110 writes the repair data as vehicle history information in the vehicle history data in the database 120 corresponding to the vehicle ID (Step S154). When the writing is preformed successfully, the terminal 20 at the mechanic's shop writes the repair data thus registered as vehicle history information in the vehicle history data in the RFID tag fixed to the vehicle and an RFID tag 72 in a vehicle registration certificate 50 (Step S156 and Step S158).

(6) When a used car transfer operation for the vehicle is performed, owner change registration will be performed. A terminal 20 at the used car dealership reads out the vehicle ID from the RFID tag fixed to the vehicle to be transferred (Step S160). Furthermore, after transferring of the vehicle is completed, owner information such as the new owner's name, address, and the like is inputted in the terminal 20 at the used car dealership, the terminal 20 transmits the owner information along with the vehicle ID thus read out to the vehicle management server 10 (Step S162). Once the control unit 110 of the vehicle management server 10 receives the vehicle ID and the owner information from the terminal 20 at the used car dealership, the owner information in relation to the new owner is registered in the owner data in the database 120 corresponding to the vehicle ID (Step S164). When the registration is performed successfully, the terminal 20 at the used car dealership writes the owner information thus registered in the owner data in the RFID tag fixed to the vehicle and an RFID tag 72 of a vehicle registration certificate 50 (Step S166 and Step S168).

In the case when the vehicle is exported, and in the case where it is exported to a country (a region) to be managed according to the product management system, processing is performed in a manner similar to that for the used car transfer as described above. When the vehicle is exported to other countries (regions), the owner data in each of the database 120 of the vehicle management server 10, the RFID tag fixed to the vehicle, and the RFID tag 72 of the vehicle registration certificate 50 are updated or unregistered-deregistered. Additionally, vehicle history information in relation to the export record is added to the vehicle history data.

Information necessary for the processing of an export function can be received, for example, from the terminal 20 at the custom house.

(7) When the vehicle is unregistered, for example, when the vehicle is disposed of, a terminal 20 at a waste disposer reads out the vehicle ID from the RFID tag fixed to the vehicle whose vehicle registration is to be unregistered (Step S170). Once date of deregistration and the like are inputted into the terminal 20 at the waste disposer, the terminal 20 transmits the data of deregistration along with the vehicle ID thus read out to the vehicle management server 10 (Step S170 and Step S172). Once the control unit 110 of the vehicle management server 10 receives the vehicle ID and the data of deregistration from the terminal 20 at the waste disposer, the control unit 110 writes the date of deregistration as vehicle history information in the vehicle history data in the database 120 corresponding to the vehicle ID (Step S174). When the deregistration is performed successfully, the terminal 20 at the waste disposer writes the date of deregistration as vehicle history information in the vehicle history data in the RFID tag fixed to the vehicle and the RFID tag 72 of the vehicle registration certificate 50 (Step S176 and Step S178).

When a manifest is issued, or in other similar cases, the vehicle history information in each of the database 120 of the vehicle management server 10, the RFID tag fixed to the vehicle, and the RFID tag 72 of the vehicle registration certificate 50 are updated through a similar processing.

Figure 10:
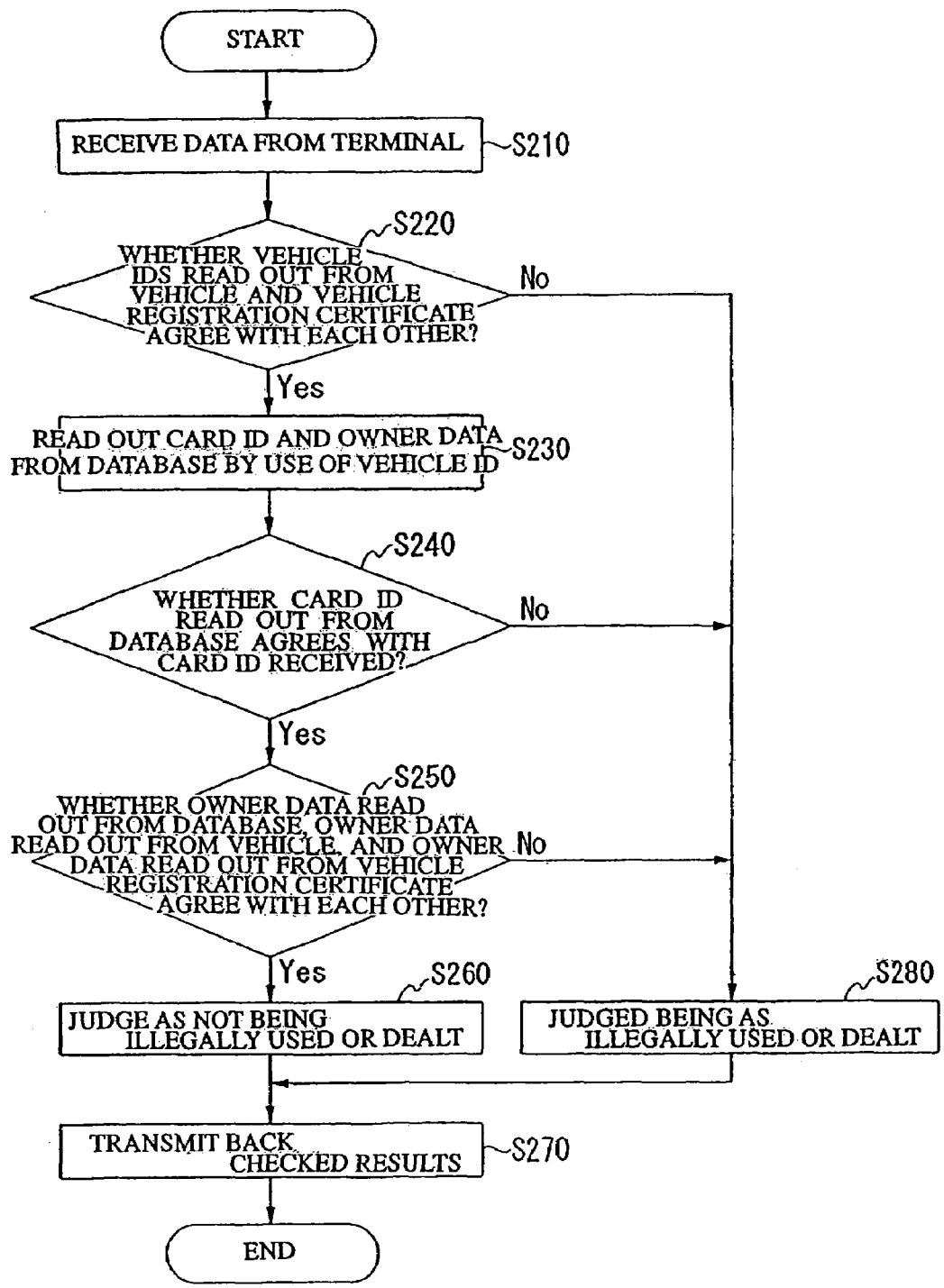
FIG. 10 is an operation flow diagram for the processing of correctness validation according to the present embodiment.

Next, operations for the processing of correctness validation in a product management system will be described hereinbelow. The processing of correctness validation is performed, for example, before the registration of the data in (4) to (7) as described above, as needed. FIG. 10 is a schematic diagram showing the flow of operations for the processing of correctness validation in the product management system.

A tag reader/writer of a terminal 20 is firstly used to read out a vehicle ID and owner data from an RFID tag fixed to a vehicle, and then to read out a card ID, a vehicle ID, and owner data from an RFID 72 of a vehicle registration certificate 50. The terminal 20 transmits these data thus read out to the vehicle management server 10.

The vehicle management server 10 receives the vehicle ID and the owner data read out from the RFID tag fixed to the vehicle; and the card ID, the vehicle ID and the owner data read out from the RFID tag 72 of the vehicle registration certificate 50 (Step S210). Then, the control unit 110 of the vehicle management server 10 validates whether the vehicle ID read out from the RFID tag fixed to the vehicle agrees with the vehicle ID read out from the RFID tag 72 of the vehicle registration certificate 50 (Step S220). When both agree, searching on the database 120 is performed by use of the vehicle ID, whereby the card ID and the owner data corresponding to the vehicle ID are read out (Step S230).

Subsequently, the control unit 110 validates whether the card ID read out from the database 120 agrees with the card ID read out from the RFID tag 72 of the vehicle registration certificate 50 (Step S240). When both agree, the control unit 110 further validates whether the owner data read out from the database 120, the owner data read out read from the RFID tag fixed to the vehicle, and the owner data read out from the RFID tag 72 of the vehicle registration certificate 50 agree with each other (Step S250). When all of the data agree, the vehicle management server 10 judges that this vehicle is one which has been used by or dealt with a valid owner (Step S260).

Then, the control unit 110 transmits validated results representing the judged results as obtained above, and the owner data backs to the terminal 20. At this time, all or a part of the vehicle data and the vehicle history data read out from the database 120 may be simultaneously transmitted back (Step S270).

The terminal 20 displays thereon the validated result received from the vehicle management server 10, the owner data, the vehicle data, the vehicle history data, and information in the RFID tag fixed to the vehicle and the RFID tag 72 of the vehicle registration certificate 50. An operator of the terminal 20 is thus able to identify that the vehicle is one which has been used by or dealt with a valid owner.

Meanwhile, it is judged (Step S280) that the vehicle is not one which has been used by or deal with a valid owner, when in Step S220, the card ID read out from the RFID tag fixed to the vehicle does not agree with the card ID read out from the RFID tag 72 of the vehicle registration certificate 50; when in Step S240, the card ID read our from the database 120 does not agree with the card ID read out from the RFID tag 72 of the vehicle registration certificate 50; or when in step S250, the owner data read out from the database 120, the owner data read out from the RFID tag fixed to the vehicle and the owner data read out from the RFID tag 72 of the vehicle registration certificate 50 do not agree with each other.

Next, the validated results representing the judged results, the owner data and the vehicle data read out from the database 120, the vehicle data, and the vehicle history data are transmitted back to the terminal 20 (Step S270). The terminal 20 displays thereon the validated results received from the vehicle management server 10, the owner data, the vehicle data, the vehicle history data, and information in the RFID tag fixed in the vehicle and the RFID tag 72 of the vehicle registration certificate 50. An operator of the terminal 20 is thus able to identify that the vehicle is not one which has been used by or dealt with a valid owner, and further obtain information for identifying a valid owner.

Moreover, in the processing of correctness validation as described above, in addition to the owner data, all or a part of the vehicle data and the vehicle history data read out from the database 120, the RFID tag fixed to the vehicle, and the RFID tag 72 of the vehicle registration certificate 50 may be checked. While the card ID is stored in advance in the RFID tag fixed to the vehicle, the validation may be performed by use of the card ID.

Alternatively, an arrangement may be provided in which permission of an operation to be performed on a vehicle is given by use of the vehicle registration certificate 50. That is, a card ID of the vehicle registration certificate 50 is stored in advance in non-rewritable storage means provided in a vehicle. Next, the card ID and the vehicle ID are read out from the vehicle registration certificate 50 by use of a tag reader/writer provided in the vehicle, prior to performing operations of any kind such as a key operation to the vehicle and the like. The vehicle then accepts the operations when the card ID thus read as above agrees with the card ID stored in the vehicle, and further when the vehicle ID thus read agrees with the vehicle ID of the vehicle.

The above-described embodiment makes it possible to validate whether the vehicle is one which has been used by or dealt with a valid owner, and further to obtain information for checking a valid owner. Therefore, even when a vehicle is stolen, it is possible to quickly locate the stolen vehicle, hence contributing in finding out a valid owner, and further preventing or restraining the thefts of vehicles.

A consumer can safely purchase a used car, since he/she can easily validate vehicle histories such as fueling history, repair condition and travel distance, in addition to validating that the used vehicle is not one which has been illegally dealt with. Moreover, by performing validation such as a key operation of the vehicle or the like by use of a card issued for each vehicle, even when only the vehicle is stolen, the vehicle will not be operable, hence restraining the theft vehicles.

Moreover, use of an RFID tag to be fixed to a vehicle as an IC tag makes it simple to read information from the vehicle.

Each of the above-described vehicle management server 10, terminal 20, portable terminal 21, and server 30 for the vehicle sales website has a computer system inside. Processes for the processing of each of the above described devices are stored in a computer-readable storage medium in the form of computer program. The computer reads out and executes this program, whereby the above-described processing is performed. Here, the computer-readable storage medium designates a magnetic disc, a magnetic optic disc, a CD-ROM, a DVD-ROM, a semi-conductor memory and the like. Alternatively, the computer program may be transmitted to a computer through a communication line, and the computer thus received the computer program may execute the program.

With reference to the drawings, the embodiment according to the present invention has been described hereinabove. However, a specific structure is not limited to that of the above-described embodiment, but the invention may be embodied in other specific forms without departing from the spirit or essential characteristics thereof.

In an embodiment other than the embodiment as described above, for example, an arrangement may take a form where a card and an IC tag store the above-described owner information, and owner identification means makes it possible to read key information from the database when key information and owner information read out from the card agree with key information and owner information read out from the IC tag, respectively.

In such a product management system, further, the card stores a card ID for identifying a card therein in advance, and a database stores the card ID therein in advance. Owner identification means then identifies an owner as a valid owner when the card ID read out from the card agrees with the card ID read out from the database and when owner information read out from the IC card agrees with owner information read out from the database.

The embodiments of the present invention have been described above in detail with reference to the drawings. However, a specific configuration is not limited to the embodiments described above but includes designs and the like without departing from the spirit of the present invention.

I claim:

1. A product management system comprising:
  a) a database operable to correlate key information relating to a product and owner information in relation to an owner of the product, and storing the key information and the owner information therein;
  b) an owner identification device operable to read out key information from an IC tag fixed to the product and having already stored therein the key information relating to the product, and to read out from the database owner information which has been correlated with the key information thus read out;
  c) a card issuance device operable to issue a card having a storage medium for storing the key information; and
  d) an identifying device operable to identify a valid owner of the product by checking and comparing key information read out from the storage medium of the card, key information read out from the IC tag, and key information read out from the database.

2. The product management system according to claim 1, wherein the key information in the IC tag is transmitted and received through wireless communication.

3. The product management system according to claim 1, wherein the key information in the storage medium of the card is transmitted and received through wireless communication.

4. The product management system according to claim 1, wherein the card and the IC tag store the owner information, and
  the identifying device also permits reading out the key information from the database when the key information and the owner information read out from the card respectively agree with the key information and the owner information read out from the IC tag.

5. The product management system according to claim 4, wherein the card stores a card ID for identifying a card; the database stores the card ID; and the identifying device identifies an owner as a valid owner when the card ID read out from the card agrees with the card ID read out from the database and when the owner information read out from the IC card agrees with the owner information read out from the database.

6. A product management system for managing a product comprising:
  a) a database which correlates product information and owner information relating to an owner of the product, and stores the product information and the owner information therein;
  b) an IC tag fixed to the product, the IC tag comprising an IC tag storage medium having information stored therein;
  c) an information transfer device operable to transfer information to and from the IC tag storage medium, and operable to transfer information to and from the database the owner information which correlates with information read out from the IC tag storage medium;
  d) a control unit which identifies a valid owner of the product by checking and comparing information read out from the IC tag storage medium and information read out from the database; and
  e) a card including a card storage medium having information stored therein, wherein the control unit identifies a valid owner of the product by checking and comparing information read out from the IC tag storage medium, information read out from the database, and information read out from the card storage medium.

7. The product management system of claim 6, wherein information is wirelessly transferred to and from both the IC tag storage medium and the card storage medium using radio frequency signals.

8. The product management system of claim 6, wherein the control unit also permits access to the information stored in the database when the information read out from the card storage medium agrees with the information read out from the IC tag storage medium.

9. The product management system of claim 6, wherein each card comprises a unique card identifier (ID) stored within the card storage medium thereof.

10. The product management system of claim 9, further comprising an information reading device provided with the product operable to read information from the card storage medium,
- the card ID is stored within the IC tag storage medium, and
- the control unit controls operation of the product based on the results of a comparison between the card ID read out from the card storage medium and the card ID read out from the IC tag storage medium.

11. The product management system of claim 6, wherein the card storage medium and the IC tag storage medium each comprise a rewritable portion and a read-only portion.

12. The product management system of claim 11 wherein each said read-only portion comprises a classification code which identifies whether the respective storage medium is fixed to a product or fixed to a card, and wherein the read-only portion further comprises a product identifier which uniquely identifies the product.

13. The product management system of claim 6, wherein the database comprises a product history data portion, and where the product management system stores event data related to events within a life cycle of a product within the product history data portion of the database.

* * * * *